United States Patent [19]

Myers

[11] 4,118,008
[45] Oct. 3, 1978

[54] ROTARY VALVE
[75] Inventor: Edward B. Myers, Oreland, Pa.
[73] Assignee: Honeywell Inc., Minneapolis, Minn.
[21] Appl. No.: 735,107
[22] Filed: Oct. 22, 1976

Related U.S. Application Data

[63] Continuation of Ser. No. 549,041, Feb. 11, 1975, abandoned.

[51] Int. Cl.² .................... F16K 25/00; F16K 5/06
[52] U.S. Cl. ............................ 251/298; 251/333; 251/86
[58] Field of Search ............... 251/298, 228, 361, 299, 251/303, 333, 86, 306, 307, 192; 137/527, 527.4, 527.6, 527.8

[56] References Cited

U.S. PATENT DOCUMENTS

| 1,074,191 | 9/1913 | Mixer | 137/329 |
|---|---|---|---|
| 2,330,610 | 9/1943 | Natter | 251/333 |
| 2,454,160 | 11/1948 | Greene | 251/361 |
| 2,664,264 | 12/1953 | Fennema | 137/527 |
| 3,106,219 | 10/1963 | Teston | 251/86 |
| 3,191,619 | 6/1965 | Allen | 251/86 |
| 3,494,589 | 2/1970 | Mumma | 251/298 |
| 3,870,071 | 3/1975 | Graham | 137/527 |
| 3,946,986 | 3/1976 | Sutter et al. | 251/298 |
| 3,963,211 | 6/1976 | Myers | 251/86 |

FOREIGN PATENT DOCUMENTS

| 1,550,204 | 10/1966 | Fed. Rep. of Germany | 251/307 |
|---|---|---|---|
| 2,355,773 | 5/1975 | Fed. Rep. of Germany | 251/298 |

Primary Examiner—William R. Cline
Assistant Examiner—H. Jay Spiegel
Attorney, Agent, or Firm—Laurence J. Marhoefer; Lockwood D. Burton; George E. Bodenstein

[57] ABSTRACT

An eccentrically rotatable control valve has a seat ring containing two seating surfaces and a stationary sealing ring mounted on an inner wall of a valve chamber to form a port therein. Rolling movement of an eccentrically mounted plug of the valve from a partial to full line fluid tight sealing contact with one of the seating surfaces of the seat ring causes the seat ring to be simultaneously moved in a rocking manner and the other seating surface of the seat ring to be moved into fluid tight sealing engagement with the stationary sealing ring. The rockable seat ring construction provides a means by which the plug and its associated seat ring can center itself in a properly seated fluid tight position on the sealing ring in the event that the sealing ring is out of properly aligned seating surface engagement with the plug.

6 Claims, 6 Drawing Figures

ROTARY VALVE

This is a continuation of application Ser. No. 549,041 filed Feb. 11, 1975 and now abandoned.

BACKGROUND OF THE INVENTION

1. Field of the Invention

The invention relates to improvements in eccentric rotary valves for flow control.

2. Description of the Prior Art

There have been many different types of spherical plugs used in prior art valves that are constructed for movement into and out of engagement with a seat port forming a wall of a valve chamber. One example of a prior art rotary valve that is used for this purpose is shown in the Hans D. Baumann Pat. No. 3,623,696.

The spherical plug that is disclosed in the aforementioned patent and an arm which extends therefrom are of a solid one-unit construction. The valve plug and arm are rotatable eccentrically in a valve chamber relative to a port seat by means of an actuator shaft mounted in the wall portions of the valve chamber.

As the actuating shaft is rotated in one direction, it rotates the spherical face of the plug eccentrically relative to the seat face of the port seat. When a portion of the plug comes in contact with the seat, the longitudinal axis of the arm commences to bend and this results in the spherical face of the plug being rubbed against the seat as continued rotation of the plug toward its closed valve position occurs.

Additional similar rubbing action is that just described will take place between the spherical contact portion of the plug and the seat of the seat port when the plug is moved along the seat toward its open position.

From the foregoing description, it can be seen that a high unit load in the form of a rubbing force is applied on a small segment of the seat port during each successive port closing and port opening operation. This rubbing action thus causes or tends to cause extensive wear to occur between the rubbing surfaces of the spherical plug and the surfaces of the seat port. The greatest extent of wear occurs where the segments of the plug and/or seat port portions are first brought into contact with one another as the valve is closed.

As the valve continues to cycle between an open and closed position, this wearing action intensifies and results in uneven wear occurring between the plug and the seat port and ultimates in increased leakage occurring between the plug and the seat port.

Another difficulty that has been encountered with prior art valves of the aforementioned type and as set forth in detail in the Charles Bates U.S. Pat. No. 3,749,358 is that the seats of many of these valves must be properly shimmed in order to effect perfect alignment and sealing. Such a shimming operation is not desirable since it takes a considerable amount of time to continuously assemble and disassemble the valve until a desirable size shim is selected to provide an acceptable seal between the plug and seat port. The shimming operation has been found to be necessary even though expensive machine shop procedures are effected to machine the parts of these valves to precise tolerances in an attempt to eliminate the valve leakage problem.

Another problem encountered with the valves of the aforementioned type is that an undesired, very high torque is required to close such valves since the plug arm, which extends between the back of the plug and the actuator shaft, is required to be flexed as the aforementioned rubbing action occurs between the plug and its seat port. Use of such one-unit plug-arm construction will, therefore, require an expensive, rather large size actuator to effect the opening and closing of such rotary valves.

SUMMARY OF THE INVENTION

It is a major object of the invention to provide an improved rotary control valve.

It is a further object of the present invention to provide an improved eccentrically rotatable control valve which avoids the rubbing action inherent in prior art structures.

It is another object of the invention to provide an improved rotary valve as set forth and which avoids the need for shimming to effect proper alignment.

It is yet another object of the invention to provide an improved valve seat arrangement as set forth wherein the plug may center itself in the sealed position.

In accomplishing these and other objects, there has been provided, in accordance with the present invention, a rotary valve having a plug member which may be moved into and out of sealing engagement with a seat ring. The seat ring is movable in a manner to effect a self-alignment with the plug. The seat ring is held in place by a second sealing or retaining ring. The outer surface of the seat ring and the inner surface of the retaining ring are contoured to also provide a fluid tight seal whenever the valve plug is in the closed position.

BRIEF DESCRIPTION OF THE DRAWINGS

A better understanding of the present invention may be had when the following detailed description is read in connection with the accompanying drawings in which.

DESCRIPTION OF THE PREFERRED EMBODIMENT

Figure 1:
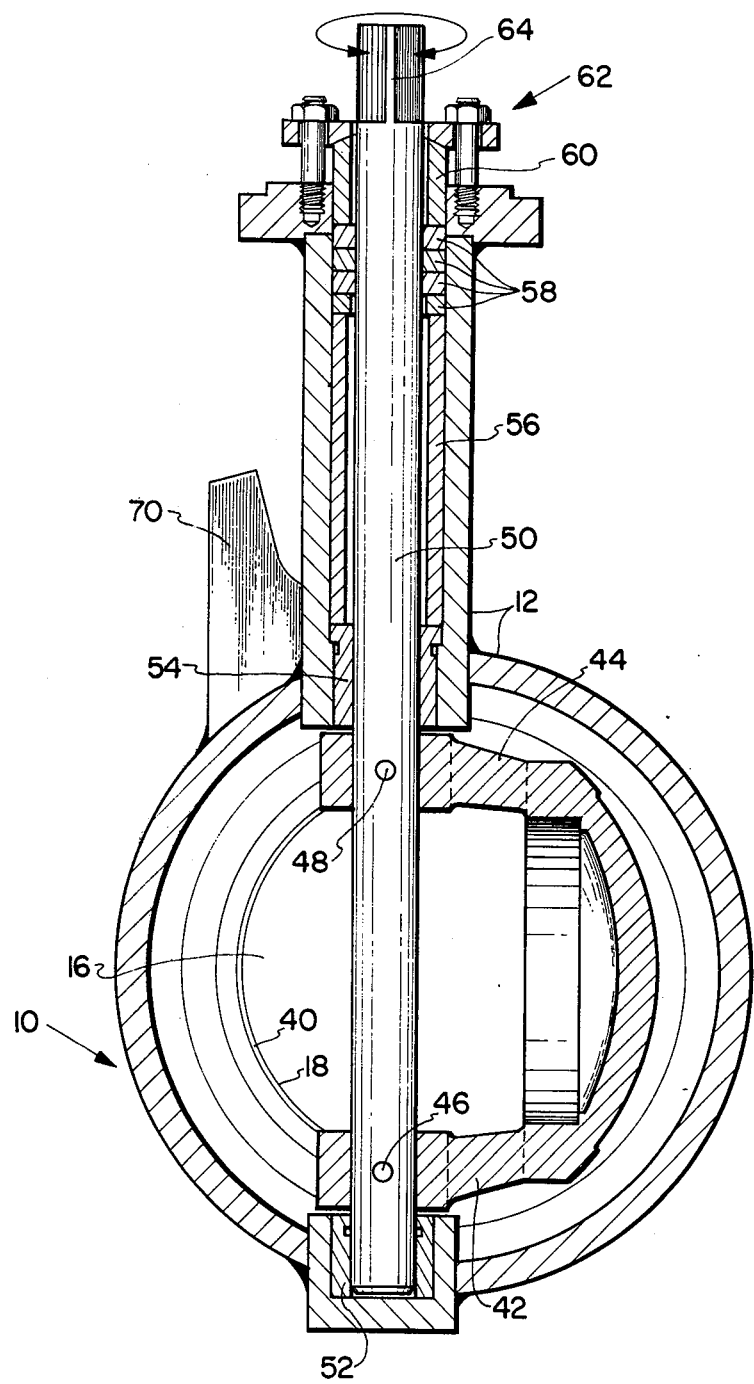
FIG. 1 is a sectional view taken through the valve chamber and the rotary valve mounted therein.

For an understanding of the preferred embodiment of the invention, reference will first be made to FIGS. 1 and 2. A valve or valve assembly 10 has a unitary valve body 12 provided with an annular tapered surface 14 that forms a valve seat port in a valve chamber 16 in the valve body 12.

A seat ring 18 has a first annular portion 20, the surface of which is of an arcuate shaped configuration. The portion 20 is positioned for movement along the tapered surface 14. The seat ring 18 has a second annular portion 22 the outer surface of which is of an arcuate shaped configuration. The seat ring 18 also has an intermediate annular outer wall surface 24 that forms an annular recess portion between the outer surfaces 20 and 22. The portion 22 is positioned for movement along a tapered inner annular surface 26 of a stationary sealing ring 28.

The inner end of the ring 28 is held in a selected fixed position against a shoulder 30 by means of a threaded connection 32. The outer end of the ring 28 has an annular portion 34 that is of a smaller diameter than the outer radius of the arcuate surface 22.

Figure 2:
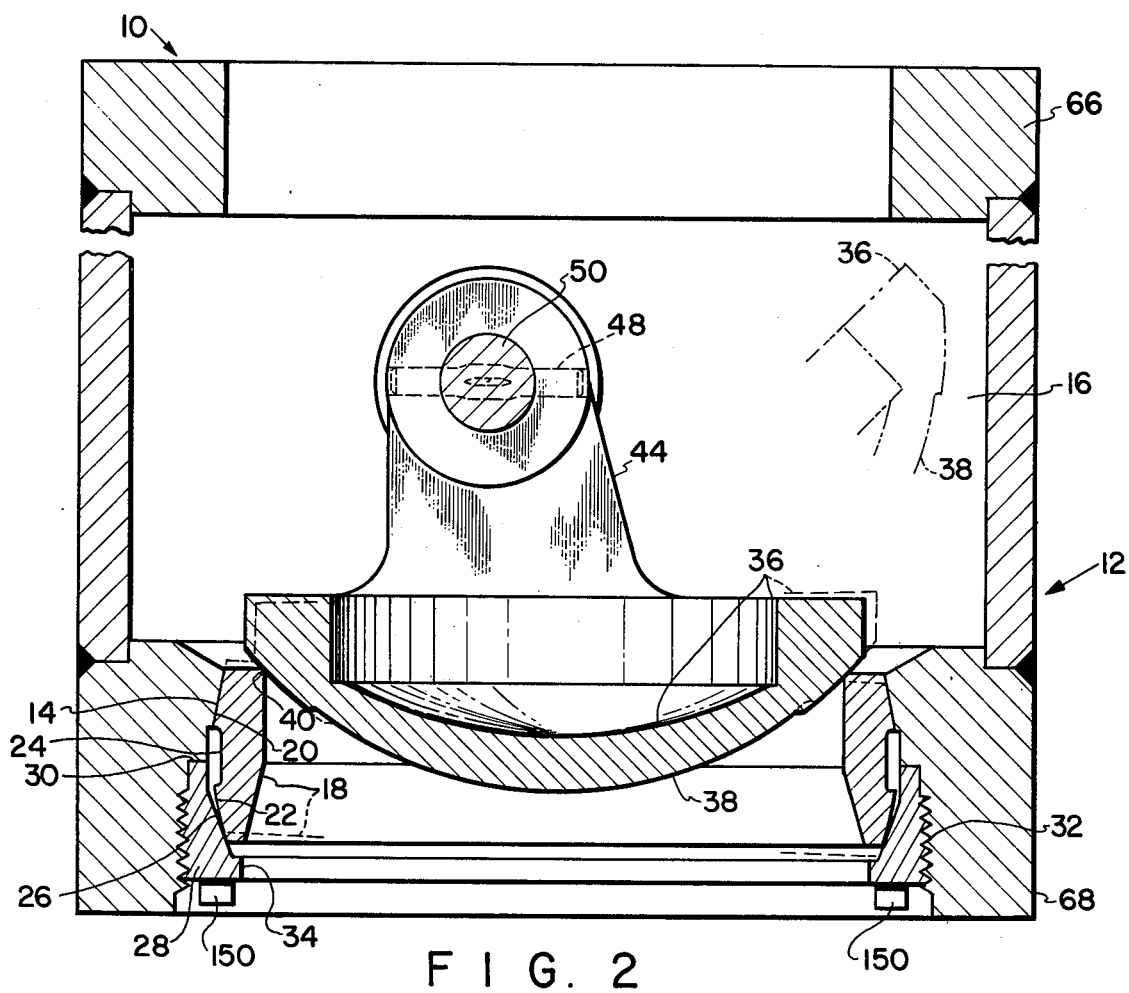
FIG. 2 shows in cross-section form the movable seat ring, actuator arm and plug of the valve shown in FIG. 1.
Figure 3:
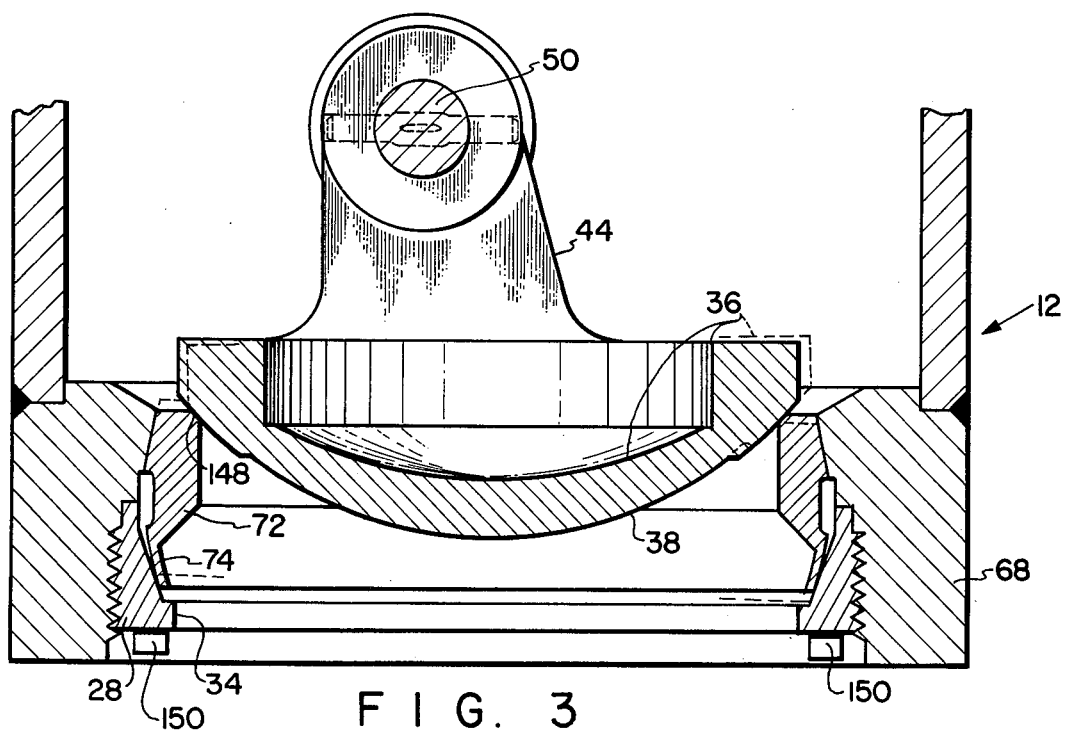
FIG. 3 is a cross-sectional view similar to FIG. 2 that shows a second form of a seat ring that can be used for the valve of FIG. 1.

FIG. 2 shows, in phantom line form, a valve plug 36 having a spherical seating surface 38 that is in a fully open position in a valve chamber 16. FIGS. 2 and 3 show, in dash line form, the position that the plug 36 will be in when it is in an intermediate partially closed position. These figures also show the valve plug 36, in solid line form, in a fully closed position against an annular chamfered seat 40 of the seat ring 18.

As shown in FIG. 1, the plug 36 has two arms 42, 44 integral therewith fixedly mounted by means of a pair of pins 46, 48 on an actuator shaft 50. The shaft 50 is supported at opposite sides of the actuating arms 42, 44 on bearings 52, 54 mounted on the valve body 12.

The actuating shaft 50 extends through the bearing 54, and a spacer 56, packing 58, and a gland 60 that are retained in place by a tie bolt and nut connection means 62.

An actuating lever, not shown, is mounted on a square end 64 of the shaft 50. A suitable manually actuated handle and/or an electric motor shaft actuating device, not shown, may be connected to the lever.

Each end of the valve body 12 has a separate sleeve 66, 68 which form port portions of the body of the valve 10 to which flanges of a connecting flow line, not shown, are connected.

The body 12 of the valve 10 also has a bifurcated portion 70 extending therefrom for engaging the shank of one of the bolts, not shown, that are used to connect the body 12 of the valve 10 to the aforementioned flanges of the conduit and to retain the valve in a non-rotatable position with respect to the conduit.

DESCRIPTION OF ADDITIONAL EMBODIMENTS OF THE INVENTION

The form of the invention as shown in FIG. 3 differs from the arrangement shown in FIGS. 1 and 2 in that the structure of FIG. 3 employs a rockable seat ring 72 that is of a different construction from the seat ring 18 employed in the structure of FIG. 2. The seat ring 72 of FIG. 3 differs from the seat ring 18 of FIG. 2 in that the thickness of the seal ring 72 at its sealing end 74 is of a substantially thinner cross-section than the sealing end of the ring 18 of FIG. 2 and provides a more resiliently deformable seat than the seat ring 18 of FIG. 2.

Figure 4:
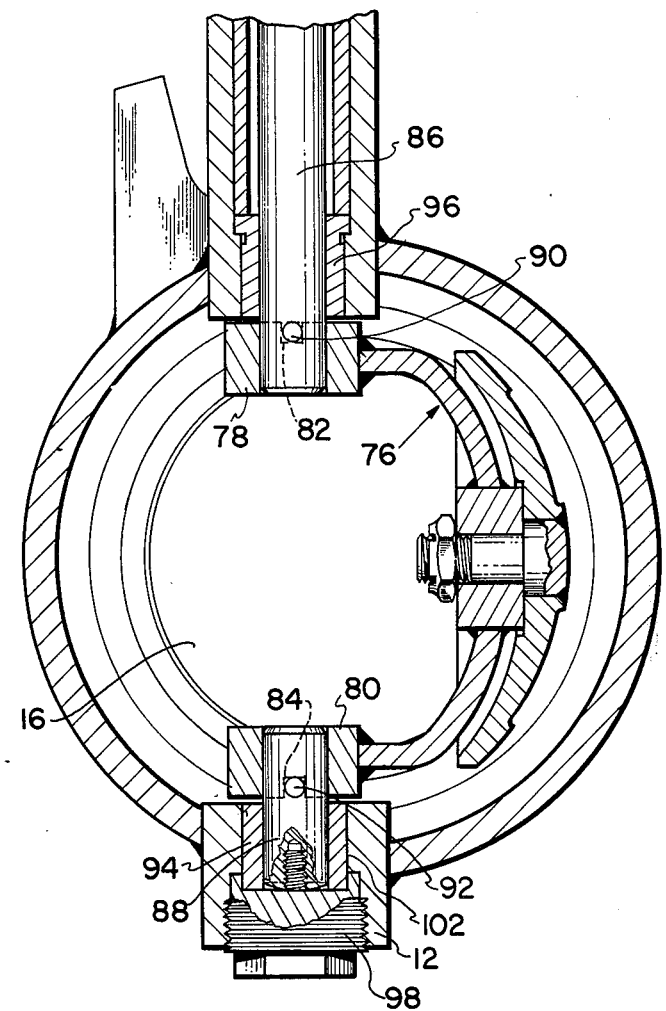
FIG. 4 is a sectional view similar to FIG. 1 that shows another form of actuator arm and plug that can be used for the present invention.
Figure 5:
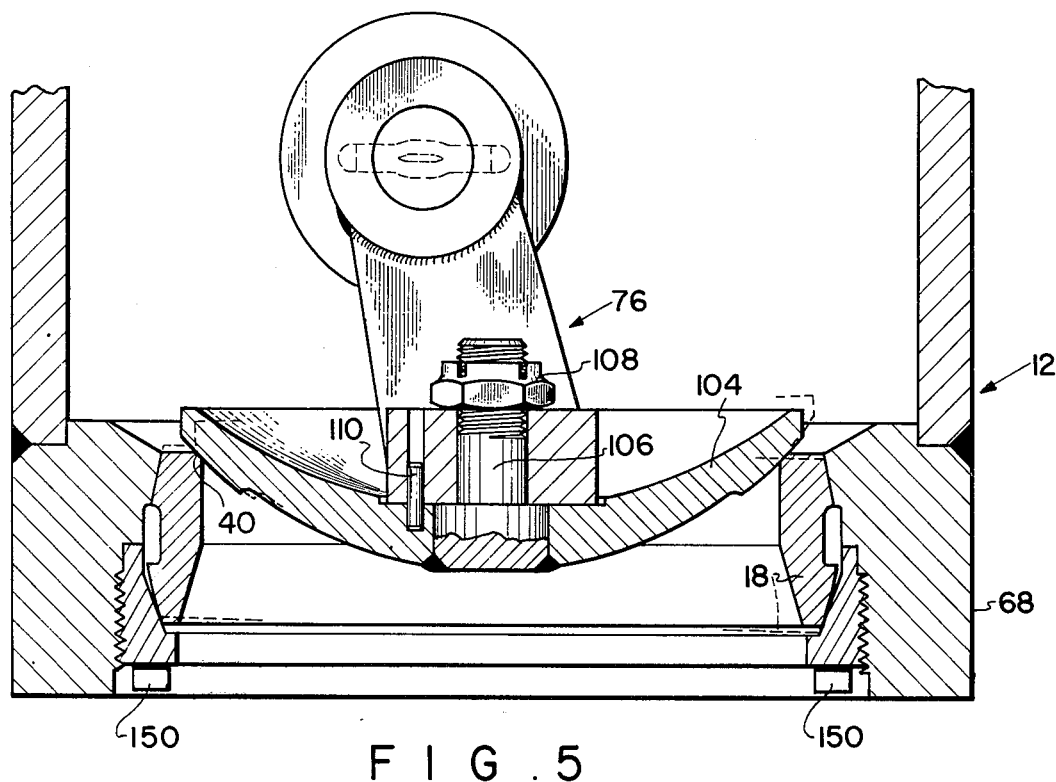
FIG. 5 shows in cross-section form the movable seat ring, actuator arm and plug of the valve shown in FIG. 4.
Figure 6:
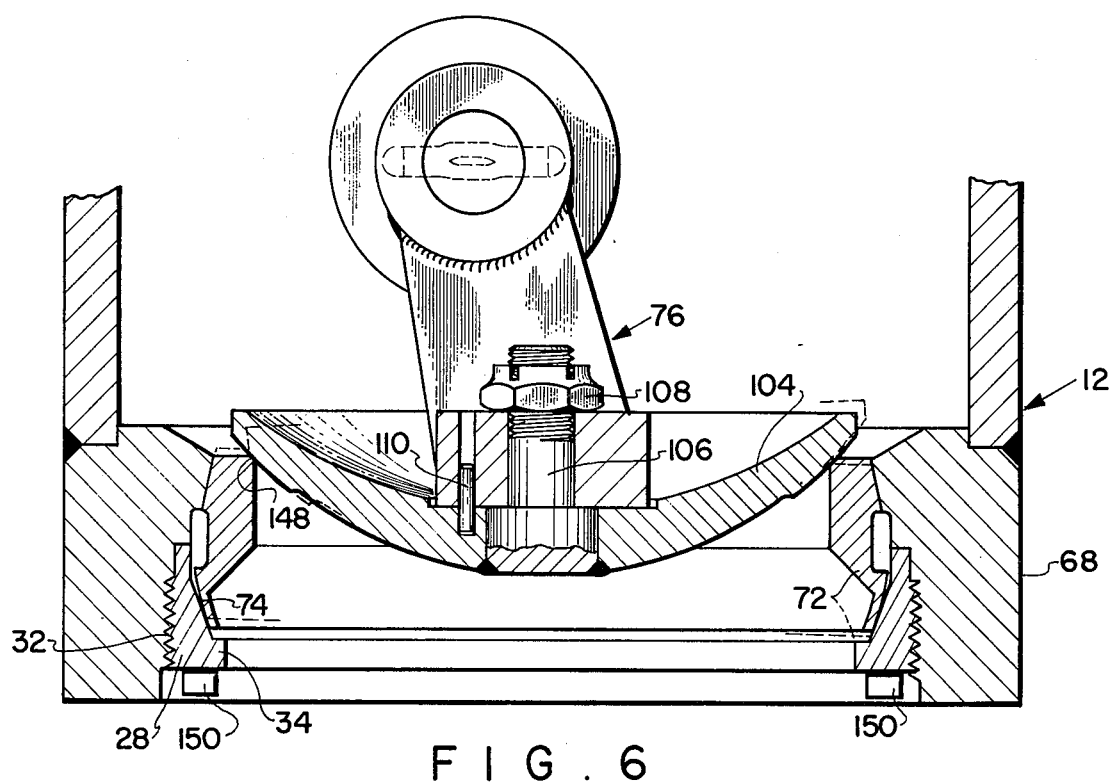
FIG. 6 is a cross-sectional view similar to FIG. 5 that shows the second form of seat ring that can be used for the valve of FIG. 4.

The form of the invention as shown in FIGS. 4-6 differs from the arrangement shown in FIG. 1 in that the plug actuating arm 76 shown in FIGS. 4-6 is in the form a welded yoke 76 rather than being of a molded, one-piece construction. Another difference is that the upper end of each of the arms 78,80 of the yoke 76 has an associated collar 82, 84 defining a square shaped opening therein.

Another difference is that two separate shafts 86, 88 are employed to support the yoke 76 in lieu of the single shaft 50 used for this purpose shown in FIG. 1.

Separate pins 90, 92 passing through the associated square openings 82, 84 formed in each arm 78, 80 and their associated shafts 86, 88 are emloyed to retain the yoke 76 in rotatable engagement with the shafts 86, 88. The shafts 86, 88 are rotatably mounted on their associated bearings 96, 94. A plug 98 is shown employed for retaining the shaft 88 in place on bearing surface 102.

Still another difference is that the plug 104 of FIGS. 4-6 is dismountably connected by means of a stud and nut connection 106, 108 to the yoke 76 whereas the plug 36 and yoke of FIGS. 1-3 are of a one-piece construction. A suitable alignment anti-spin pin 110 is provided for the arrangement shown in FIGS. 4-6.

FIG. 6 differs from FIG. 5 in that the seat ring of FIG. 5 is the same as the previously described seat ring 18 shown in FIG. 2 whereas the seat ring of FIG. 6 is the same as the previously described seat ring 72 shown in FIG. 3.

MODE OF OPERATION

The valve plug 36 shown in FIGS. 1-3 is mounted by means of the arms 42, 44 and their connecting pins 46, 48 to the actuator shaft 50 for rotatable movement therewith. The longitudinal center of the shaft 50 is displaced to the left, as viewed, e.g., in FIG. 2 of the drawings, of the longitudinal centerline of the sealing ring 28 and port 68.

When the shaft 50 is rotated in a clockwise direction as viewed in FIG. 2, the plug will initially be moved from its completely open, phantom line, position shown inside the valve chamber 16 to its intermediate, partially closed dash line position.

When the plug 36 is moved to this intermediate dash line position, a portion of its outer spherical surface 38 will be brought into line contact with the beveled surface seat portion 40 of the seat ring 18.

As additional valve closing rotary motion of the plug 36 occurs, the seat ring 18 is rocked along the tapered valve body surface 14 and along the tapered inner annular surface 26 of the stationary sealing ring 28. While this rolling movement of the plug 36 takes place, the annular outer arcuate shaped surfaces 20, 22 of the seat ring 18 will thus be rocked in the aforementioned manner along their respective annular tapered surfaces 14, 26.

The joint rolling movement of the plugs 36 and the rocking movement of the seat ring 18 continue until the spherical surface 38 of the plug 36 is brought into surface-to-surface fluid tight sealing contact with the annular seat 40 of the seat ring 18 as shown in solid line form. While the spherical surface 38 of the plug is moved into its solid line, fully sealed position, the annular arcuate surface 22 of the seat ring 18 will simultaneously be moved into fluid tight sealed engagement with the tapered seating surface formed on the inner surface 26 of the sealing ring 28.

The provision of a rockable seat ring 18 and a stationary sealing ring 28 in a valve chamber 16 allows the partial spherical surface 38 of the plug 36 to seat itself in good line contact seating engagement with the beveled seating surface 40 of the seat ring 18 while the outer annular arcuate seating surface portion 22 is brought into sealed, fluid tight engagement with the seating surface 26 of sealing ring 28. The self-seating by rocking characteristic of the seat ring 18 is beneficial in providing good, tight, valve closing, particularly under a condition in which an eccentricity or other mis-alignment may occur between the plug 38 and the seat 40.

The constructon of the seat ring 18 of the self-aligned rotary valve 10 of this invention thus allows the seat ring 18 to be rocked while the partial spherical seating surface 38 of the plug 36 is simultaneously rolled into and out of aligned sealing contact with the seating surface 40 of the seat ring 18.

The seat ring construction, in accordance with the present invention, will, therefore, substantially reduce the wear and increase the useful life of the rotary valve plugs and seats over the prior art rubbing type plug and seat arrangement. Inasmuch as the full seating of the plug is accomplished without requiring a flexing of arms 42, 44, relatively low driving torque is required to actuate this valve.

The arm mountings 42, 44, and 76 shown, respectively, in FIGS. 3 and 6 are each constructed to enable the spherical seat of each of their respective plugs 36, 104 to be rolled, in a self-aligning manner, into engagement with their associated annular beveled seat surfaces 148 of the seat ring 72 in the same manner as set forth above under the description of FIGS. 1 and 2. The seat ring 72 at its sealing end 74 in FIGS. 3 and 6 is made of a thinner and more resilient construction than the seat ring 18 shown in FIG. 2. Because of the resiliently deformable construction of the seat ring 74, this ring 74, can, therefore, be employed to obtain a tighter fluid tight joint than that offered by the thicker and less resilient seat ring construction 18 shown in FIG. 1 of the drawing.

In FIG. 4, the yoke 76 is shown supported on two shafts 86, 88 rather than on a single shaft 50 as shown in FIG. 1. Since the dual shaft construction 86, 88 takes up less space in the valve chamber 16 than does the single shaft 50, the dual shaft arrangement shown in FIGS. 4, 5 and 6 will allow a greater flow of fluid to pass through the valve chamber 16 than the arrangement shown in FIGS. 1-3. The flow Cv or a factor relating to the efficiency of the valve shown in FIGS. 4, 5 and 6 will thus be at a higher value than the Cv value of the valve construction shown in FIGS. 1-3.

The sealing ring 28 has an annular portion 34 forming a shoulder on its lower-most inner wall. This shoulder acts as a stop for seat rings 18 and 72 to limit the magnitude of the rocking motion of the seat rings 18, 72.

Each of the sealing rings 28 is shown having a threaded connection 32 with the sleeve-shaped valve body portion 68 to enable it to be removed from the valve body 12 by rotating the lugs 150 in a direction to unscrew the unit.

When the sealing ring 28 is removed from the sleeve 68 of the valve body 12, the associated seat ring 18, 72 can be readily withdrawn through the open end of the sleeve 68.

The plug 36 and the associated integral yoke actuator portions 42, 44 can be readily removed from their mounted position on the shaft 50, FIG. 1, by merely removing their pins 46, 48; and by then pulling the shaft 50 away from the associated yoke portions 42, 44. Each plug and yoke unit 36, 42, 44 can then be readily withdrawn through the then open end of the sleeve 68.

Thus, it may be seen that there has been provided, in accordance with the present invention, an improved rotary valve which is relatively free from a rubbing action incident to seating, and which provides self-centering seating with no shimming and relatively low driving torque needs.

The embodiments of the invention in which an exclusive property or privilege is claimed are defined as follows:

1. A rotary fluid valve comprising
   a body containing a valve chamber having a fluid port,
   a rigid sealing ring secured within said chamber and having an inner annular seating surface which converges toward said port to form a stationary converging inner wall portion of said chamber.
   a plug having a seating surface,
   means for supporting said plug on the chamber side of said port for rotation about an axis which is radially offset with respect to the axis of said port and said sealing ring,
   a movable annular seat ring located in said chamber between said supporting means and said sealing ring, said seat ring having an outer annular arcuate seating surface engaging said converging seating surface of said sealing ring, and having an inner annular seating surface facing said supporting means,
   means for rotating said plug about its said axis to cause said seating surface of said plug to engage said inner seating surface of said seat ring and to move said seat ring into the position in which said inner seating surface of said seat ring is moved into sealing engagement with said seating surface of said plug, and said outer seating surface of said seat ring is simultaneously moved into sealing engagement with said seating surface of said sealing ring, and
   an inner wall surface which engages said seat ring, said inner wall surface and said engaging seat ring having shapes which cooperate to cause said inner wall surface to guide said movement of said seat ring and to limit the movement of said seat ring in the direction away from said sealing ring to prevent the displacement of said seat ring to an inoperative position.

2. A valve as specified in claim 1, wherein said seating surface of said sealing ring is tapered toward said pot where engaged by said outer seating surface of said seat ring.

3. A valve as specified in claim 1, wherein said seat ring has a substantially thinner cross-section in the vicinity of said outer seating surface thereof with respect to the remainder of said seat ring, whereby said outer seating surface resiliently engages said seating surface of said sealing ring.

4. A rotary fluid valve comprising
   a body containing a valve chamber having a fluid port and having an annular inner wall surface spaced from said port,
   a rigid sealing ring secured within said chamber between said inner wall surface and said port and having an inner annular seating surface which converges toward said port to form a stationary converging inner wall seating portion of said chamber,
   a lug having a seating surface,
   means for supporting said plug on the chamber side of said port for rotation about an axis which is radially offset with respect to the axis of said port and said sealing ring,
   a moveable annular seat ring located in said chamber between said supporting means and said sealing ring, said seat ring having an outer annular arcuate seating surface engaging said converging seating surface of said sealing ring, having an inner annular seating surface facing said supporting means, and having a second outer annular arcuate surface engaging said inner wall surface of said chamber, and means for rotating said plug about its said axis to cause said seating surface of said plug to engage said inner seating surface of said seat ring and to move said seat ring into the position in which said inner seating surface of said seat ring is moved into sealing engagement with said seating surface of said plug, and said outer seating surface of said seat ring is simultaneously moved into sealing enagement with said seating surface of said sealing ring, said moving of said seat ring causing said second outer surface of said seat ring to move on
said inner wall surface of said chamber and said engaging second outer surface of said seat ring having shapes which cooperate to cause said inner wall surface to guide said movement of said seat ring and to limit the movement of said seat ring in the direction away from said sealing ring to prevent the displacement of said seat ring to an inoperative position.

5. A valve as specified in claim 4, wherein said inner wall surface of said chamber converges toward said plug.

6. A valve as specified in claim 5, wherein said inner wall surface of said chamber is tapered toward said plug.

* * * * *